(12) United States Patent
Scott et al.

(10) Patent No.: US 10,815,665 B2
(45) Date of Patent: Oct. 27, 2020

(54) CONCRETE ANCHOR WITH RETAINER

(71) Applicant: PRECISION-HAYES INTERNATIONAL INC., Seagoville, TX (US)

(72) Inventors: Jeffrey Scott, Menomonee Falls, WI (US); Shane Taylor, Hurst, TX (US); Thomas Mathews, Midlothian, TX (US); Tim Beaver, Sugar Land, TX (US)

(73) Assignee: PRECISION-HAYES INTERNATIONAL INC., Seagoville, TX (US)

( * ) Notice: Subject to any disclaimer, the term of this patent is extended or adjusted under 35 U.S.C. 154(b) by 0 days.

(21) Appl. No.: 16/266,497

(22) Filed: Feb. 4, 2019

(65) Prior Publication Data

US 2019/0242131 A1 Aug. 8, 2019

Related U.S. Application Data

(60) Provisional application No. 62/626,378, filed on Feb. 5, 2018.

(51) Int. Cl.
*E04D 13/00* (2006.01)
*E04C 5/12* (2006.01)
*F16G 11/10* (2006.01)

(52) U.S. Cl.
CPC ............ *E04C 5/122* (2013.01); *F16G 11/105* (2013.01)

(58) Field of Classification Search
CPC ............................... E04C 5/122; F16G 11/105
See application file for complete search history.

(56) References Cited

U.S. PATENT DOCUMENTS 3,049,775 A 3/1959 Ondeck
4,307,550 A * 12/1981 Behar ............... B28B 23/04
24/136 R (Continued)

FOREIGN PATENT DOCUMENTS

WO 2011126170 A1 10/2011

OTHER PUBLICATIONS

European Search Report in EP App. No. 19155494.8 dated Jul. 4, 2019 (6 pages).

*Primary Examiner* — Joshua K Ihezie
(74) *Attorney, Agent, or Firm* — Adolph Locklar

(57) ABSTRACT

An anchor assembly for use with a tensioning strand includes an anchor body including a bore therethrough, the bore configured to receive the strand therethrough, an inner surface of the bore including a frustoconical wedge-receiving cavity, at least one frustoconical wedge including a strand-engaging inner surface and an anchor body engaging outer surface, the wedge being at least partially received in the wedge-receiving cavity, an encapsulating layer at least partially surrounding the anchor body, and a wedge retention disk mechanically coupled to the anchor body and positioned so as to prevent the wedge from fully exiting the wedge-receiving cavity. The wedge retention disk may be spaced apart from the anchor body such that the wedge can move axially with respect to the anchor body between a seated position in which the wedge engages the wedge-receiving cavity and an unseated position in which the wedge engages the wedge retention disk.

15 Claims, 5 Drawing Sheets

(56) References Cited

U.S. PATENT DOCUMENTS

| | | | |
|---|---|---|---|
| 4,719,658 A * | 1/1988 | Kriofske | E04C 5/122 52/223.13 |
| 4,896,470 A | 1/1990 | Sorkin | |
| 4,899,499 A | 2/1990 | Hoekstra | |
| 5,072,558 A | 12/1991 | Sorkin | |
| 5,720,139 A | 2/1998 | Sorkin | |
| 5,749,185 A | 5/1998 | Sorkin | |
| 5,755,065 A * | 5/1998 | Sorkin | E04C 5/12 52/223.13 |
| 5,788,398 A | 8/1998 | Sorkin | |
| 5,839,235 A | 11/1998 | Sorkin | |
| 6,017,165 A | 1/2000 | Sorkin | |
| 6,023,894 A * | 2/2000 | Sorkin | E04C 5/122 24/122.6 |
| 6,098,356 A | 8/2000 | Sorkin | |
| 6,234,709 B1 | 5/2001 | Sorkin | |
| 6,354,596 B1 * | 3/2002 | Rodriguez | E04C 5/12 174/153 G |
| 6,380,508 B1 | 4/2002 | Sorkin | |
| 6,381,912 B1 | 5/2002 | Sorkin | |
| 6,513,287 B1 | 2/2003 | Sorkin | |
| 6,560,939 B2 | 5/2003 | Sorkin | |
| 6,631,596 B1 | 10/2003 | Sorkin | |
| 6,817,148 B1 * | 11/2004 | Sorkin | E04C 5/12 24/122.6 |
| 6,843,031 B1 | 1/2005 | Sorkin | |
| 7,275,347 B2 * | 10/2007 | Hayes | E04C 5/12 24/122.6 |
| 7,424,792 B1 | 9/2008 | Sorkin | |
| 7,676,997 B1 | 3/2010 | Sorkin | |
| 7,841,061 B1 | 11/2010 | Sorkin | |
| 7,950,196 B1 | 5/2011 | Sorkin | |
| 7,963,078 B1 * | 6/2011 | Sorkin | E04C 5/122 24/122.3 |
| 8,087,204 B1 | 1/2012 | Sorkin | |
| 9,062,457 B2 * | 6/2015 | Gilling | E04C 5/165 |
| 9,091,064 B1 | 7/2015 | Dahl | |
| 9,926,698 B2 * | 3/2018 | Sorkin | E04C 5/12 |
| 2004/0148882 A1 * | 8/2004 | Hayes | E04C 5/12 52/223.14 |
| 2006/0179742 A1 * | 8/2006 | Mathews | E04C 5/122 52/223.13 |
| 2015/0330078 A1 * | 11/2015 | Sorkin | E04B 1/66 52/223.13 |

\* cited by examiner

CONCRETE ANCHOR WITH RETAINER

CROSS-REFERENCE TO RELATED APPLICATIONS

This application is a non-provisional application which claims priority from U.S. provisional application No. 62/626,378, filed Feb. 5, 2018, which is incorporated by reference herein in its entirety.

FIELD

The present application relates to anchors for reinforced concrete.

BACKGROUND

Pre-stressed concrete is structural concrete in which internal stresses are introduced to reduce potential tensile stresses in the concrete resulting from applied loads. Pre-stressing concrete may be accomplished by two methods—post-tensioned pre-stressing and pre-tensioned pre-stressing. When post tensioning concrete, the stressing assembly is tensioned after the concrete has attained a specified strength. The stressing assembly, commonly known as a tendon, may include for example and without limitation, anchorages, one or more strands, and sheathes or ducts. The strand is tensioned between anchors that are embedded in the concrete once the concrete has hardened. The strand may be formed from a metal or composite or any suitable material exhibiting tensile strength that can be elongated, including, for example and without limitation, reinforcing steel, single wire cable, or multi-wire cable.

The strand is typically fixedly coupled to a fixed anchorage positioned at one end of the tendon, the so-called "fixed end" and may be stressed at the other anchor, the "stressing end" of the tendon. The strand is generally held to each anchor by one or more wedges. Typically, anchors include a tapered recess that, when the strand is placed under tension, causes the wedges to further engage the strand. Wedges are typically made of metal. Typically, wedges must be assembled to or threaded onto the end of the strand once the strand is in position in the concrete member. In the case of a bridge or other elevated structure, there is a risk of dropping wedges. Additionally, as strands may extend far from the end of the structure and bend due to gravity, the ability to thread the wedge onto the end of the strand is limited. Furthermore, misalignment between the wedges during installation may damage the strand or result in an insufficient anchor between strand and the anchor.

FIGS. 1 and 2 illustrate various components of a post-tension anchoring system in accordance with the prior art, designated generally at 10. FIG. 1 is an exploded view of a prior art post tension anchoring system 10, i.e., prior to assembly. Prior art post tension anchoring system 10 includes a strand 12 and an anchor body 20. Strand 12 has an exposed end protruding from a sheath 14. The exposed end of strand 12 may be fitted through extension tube 16. Extension tube 16 has a diameter larger than sheath 14 such that first end 16a of extension tube 16 may overlie sheath 14. Second end 16b of tube 16 fits over a rear tubular portion 18 of anchor body 20. Rear tubular portion 18 includes a bore therethrough, extending between a rear aperture (not shown) and a front aperture 22. The interior walls of anchor body 20 between front aperture 22 and rear aperture define a wedge receiving cavity 23 for receiving wedges 24, 26 and may include groove or ridge 27, as shown in FIG. 2.

FIG. 2 illustrates an assembled view (in one-fourth cutaway perspective) of prior art post tension anchoring system 10. As shown in FIG. 2, strand 12 extends through extension tube 16 and anchor body 20. Second end 16b of extension tube 16 may be force-fitted over rear tubular portion 18. The first end 16a of extension tube 16 may be sealed to sheath 14, by use of tape or other means.

With strand 12 extending outwardly from front aperture 22, when the far end of the tendon is fixed, tension may be applied to strand 12, typically by use of a hydraulic jack. Tension on strand 12 forces wedges 24 and 26 into the wedge receiving cavity 23. Teeth 24a and 26a (shown in FIG. 1) on the inner surfaces of wedges 24, 26 may lock strand 12 in a fixed position with respect to anchor body 20. Thereafter, the tension supplied by the hydraulic device can be released and the excess strand extending outward from anchor body 20 can be cut. Engagement of wedges 24, 26 with anchor body 20 thereafter prevents strand 12 from moving to anchor body 20.

FIG. 3 shows prior art post-tension system 10' including an encapsulated anchor 30 and a cap 40 for use therewith. Encapsulated anchor 30 may include an encapsulation layer 32 that substantially encapsulates anchor body 20. Encapsulation layer 32 may be polymeric and may be applied, for example, by injection molding the encapsulation material around anchor body 20. As in FIGS. 1 and 2, the tendon may be seated and locked with respect to anchor 30 by wedges 24, 26 disposed within wedge receiving cavity 23 of encapsulated anchor 30.

Referring to FIGS. 3 and 4, encapsulation layer 32 may include an annular or tubular section 34 that extends outwardly from the front of anchor body 20. As illustrated in FIG. 4, in which the wedges and strand are omitted for clarity, cap 40 may be adapted to engage the interior of tubular section 34. In some instances, cap 40 may engage a groove 36 formed in the encapsulation layer 32 or may engage a ring or other device embedded in or affixed to tubular section 34. In other instances, cap 40 may engage the exterior of tubular section 34 or may engage directly with anchor body 20.

Cap 40 may be constructed of a polymer, such as high-density polyethylene or polypropylene. Sealing cap 40 may include a tubular section 44 for covering the exposed end of strand 12 and, in some instances, retaining a rust inhibitor chemical. Sealing cap 40 may also include an outer lip 46 adapted to form a surface-to-surface sealing friction-fit contact with the interior tubular section 34 once sealing cap 40 is connected to anchor 30. Sealing cap 40 may in some instances include an O-ring seal adapted to be compressed between sealing cap 40 and tubular section 34 when sealing cap 40 is connected to anchor 30.

Production of fixed-end concrete anchors includes assembling a fixed-end anchor to a tendon fixed-end. Such an assembly may include stripping a sheath material, placing the anchor onto the tendon, loading this tendon/anchor into the seating machine, inserting a wedge assembly into the anchor and onto the tendon, and then power-seating the wedge into the anchor and onto the tendon. This seating operation includes a pressing cylinder that comes down onto the tendon and wedge and applies force on the order of 33,000 lbf (146,800 N), to these parts to mechanically seat the wedge into the anchor and onto the tendon. The insertion of the wedges into the anchor, prior to seating, exposes the operator to potential safety issues, as the operator needs to have his fingers out of the assembly before the seating cylinder performs the seating operations.

SUMMARY

The present disclosure provides a wedge retention assembly that enables the supply of anchor bodies in which the wedges have already been inserted.

Some embodiments of an anchor assembly for use with a tensioning strand include an anchor body having a bore therethrough, at least one frustoconical wedge, an encapsulating layer at least partially surrounding the anchor body, and a wedge retention disk mechanically coupled to the anchor body. An inner surface of the bore may include a frustoconical wedge-receiving cavity. The at least one frustoconical wedge may be at least partially received in the wedge-receiving cavity and may include a strand-engaging inner surface and an anchor body-engaging outer surface. The wedge retention disk may be positioned so as to prevent the at least one wedge from fully exiting the wedge-receiving cavity. The wedge retention disk may be axially spaced apart from the anchor body such that the wedge may move axially with respect to the anchor body between a seated position in which the wedge engages the wedge-receiving cavity and an unseated position in which the wedge engages the wedge retention disk. According to some embodiments, in the unseated position, wedges 24, 26 may move apart, thereby expanding the bore through which the strand passes and facilitating insertion of the strand.

The wedge retention disk may be integrally formed with the encapsulating layer or may be directly or indirectly mechanically coupled to the anchor body. The encapsulating layer may include a groove and the wedge retention disk may engage the groove. The anchor assembly may further include a cap adapted to be mechanically coupled to the groove.

A method for applying an anchor assembly to a tensioning strand may include the steps of a) providing an anchor assembly including an anchor body having a bore therethrough and an inner surface of the bore including a frustoconical wedge-receiving cavity, at least one frustoconical wedge including a strand-engaging inner surface and an anchor body engaging outer surface, the wedge being at least partially received in the wedge-receiving cavity, an encapsulating layer at least partially surrounding the anchor body, and a wedge retention disk positioned so as to prevent the at least one wedge from fully exiting the wedge-receiving cavity; b) inserting a strand through the anchor body and the at least one wedge; c) retaining the at least one wedge at least partially within the wedge-receiving cavity with the wedge retention disk; and d) applying a tensioning force on the strand so as to move the strand and the at least one wedge into a seated position in which the at least one wedge engages the wedge-receiving cavity and the strand.

The wedge retention disk may define a space between the anchor body and the encapsulating layer, whereby the at least one wedge can move axially with respect to the anchor body between the seated position in which the wedge engages the wedge-receiving cavity and an unseated position in which the wedge engages the wedge retention disk. Step b) may include inserting the strand through the wedge retention disk.

The method may further include the step of e) adding a cap to the anchor assembly and coupling the cap to the encapsulating layer and step e) may include deforming the wedge retention disk. The wedge retention disk may be integrally formed with the encapsulating layer, in which case step e) may include separating the wedge retention disk from the encapsulating layer. In other embodiments, the encapsulating layer may include a groove, the wedge retention disk may engage the groove, and step e) may include shifting the wedge retention disk out of engagement with the groove and coupling the cap to the groove.

DETAILED DESCRIPTION

This disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

The use of "including", "comprising", or "having" and variations thereof herein is meant to encompass the items listed thereafter and equivalents thereof as well as additional items. Unless specified or limited otherwise, the terms "mounted", "connected", "supported", and "coupled" and variations thereof are used broadly and encompass both direct and indirect mountings, connections, supports, and couplings. Further, "connected" and "coupled" are not restricted to physical or mechanical connections or couplings.

Figure 1:
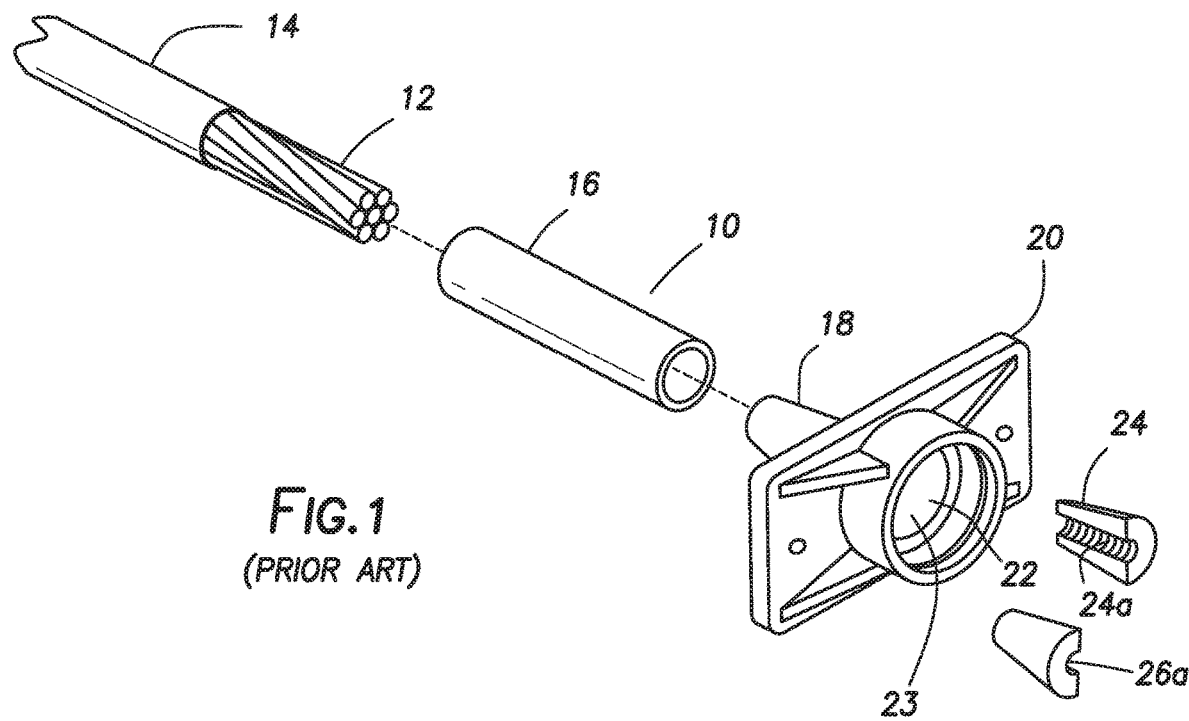
FIG. 1 is a perspective exploded view of a prior art post-tension anchoring system.
Figure 2:
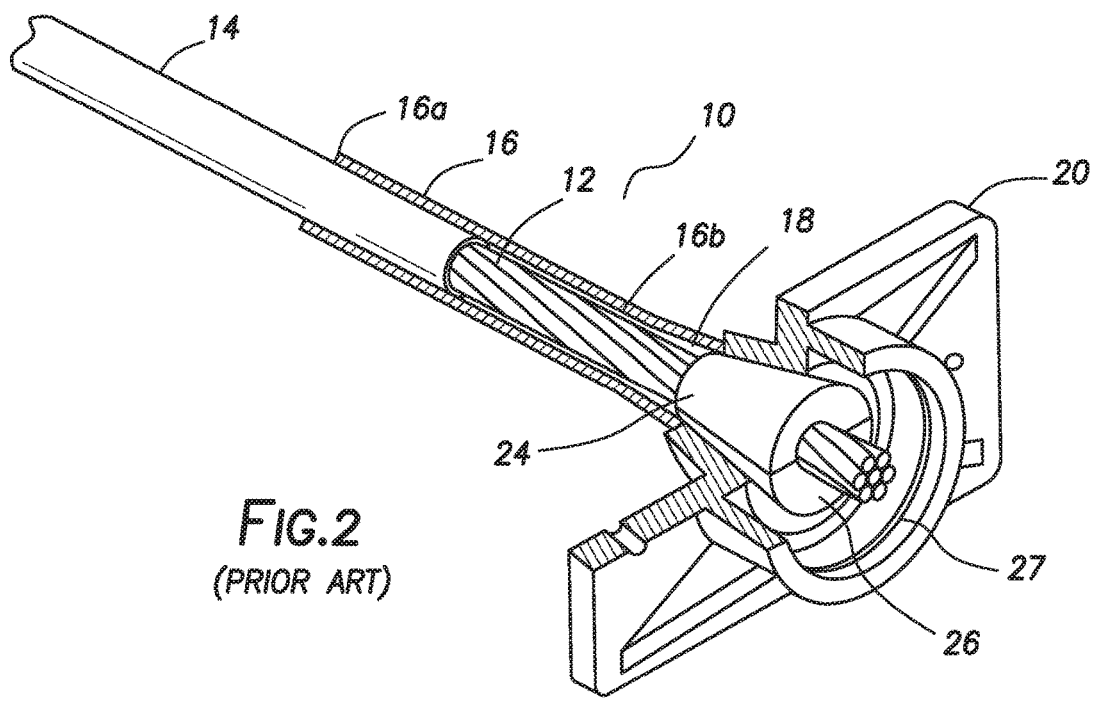
FIG. 2 is an assembled view of the prior art post-tension anchoring system of FIG. 1, with a portion cut away for purposes of illustration.
Figure 3:
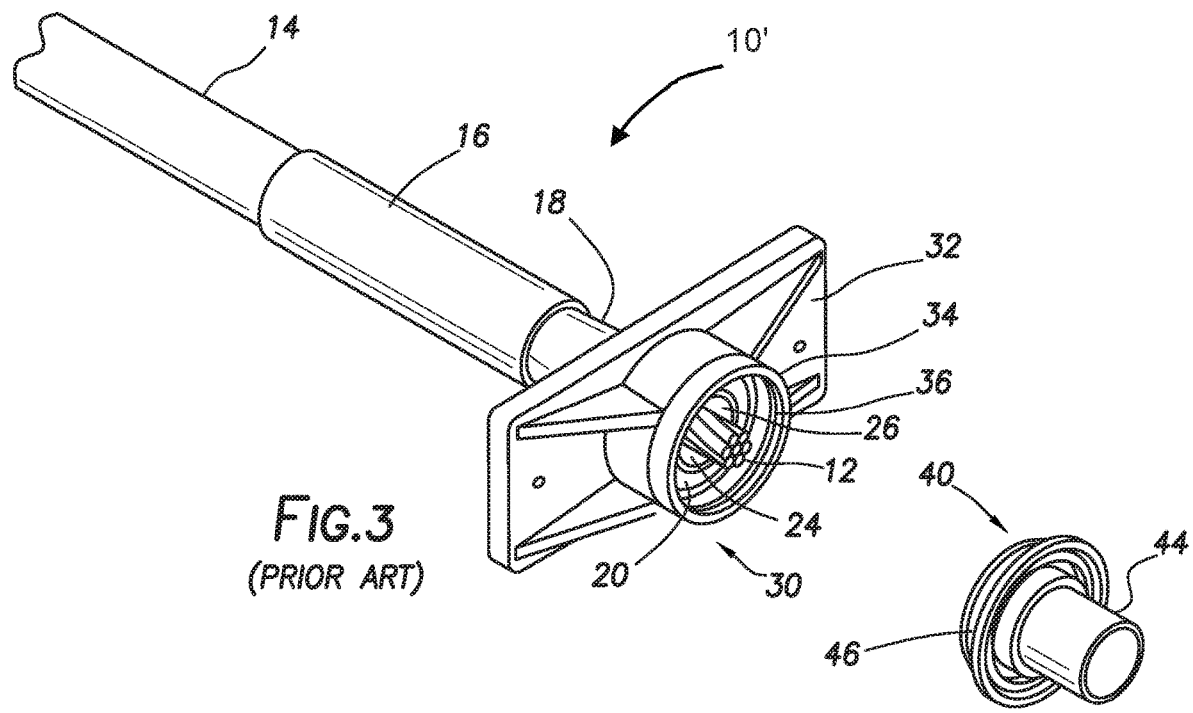
FIG. 3 is a perspective exploded view of a prior art cap connection system.
Figure 4:
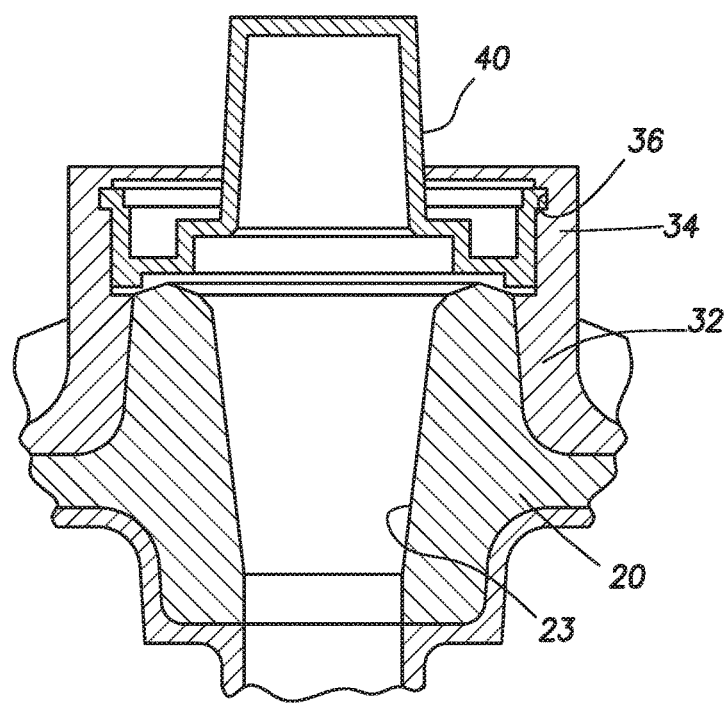
FIG. 4 is cross-sectional side assembled view of the cap connection system of FIG. 3 with wedges and strand removed for clarity.
Figure 5:
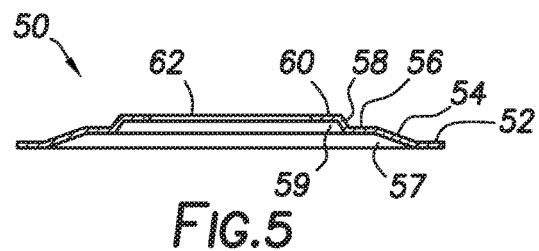
FIG. 5 is a cross-sectional view of a wedge retention disk in accordance with certain embodiments of the present disclosure.
Figure 6:
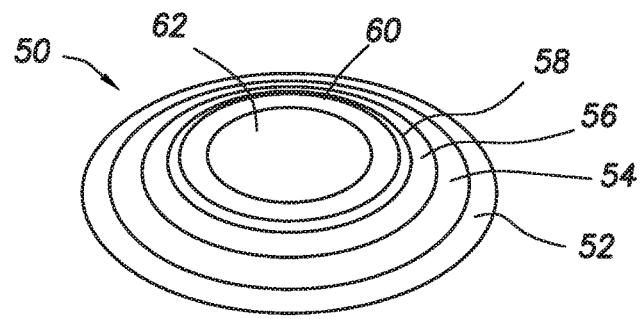
FIG. 6 is a perspective view of the wedge retention disk of FIG. 5.
Figures 7, 8:
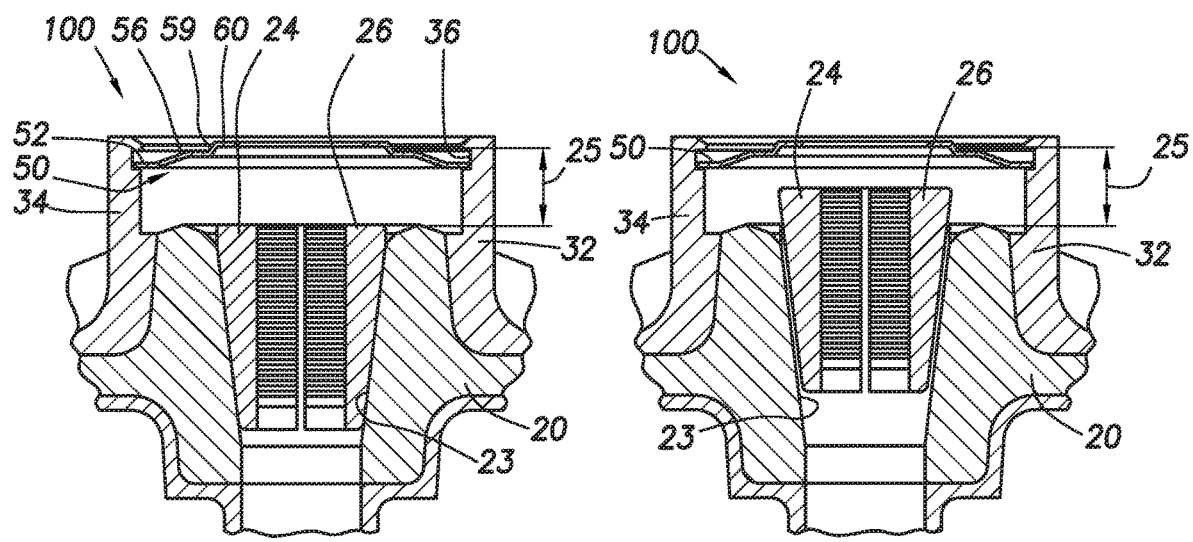
FIG. 7 is a cross-sectional view of an anchor, wedges, and a wedge retention disk.
FIG. 8 is a cross-sectional view of the anchor, wedges, and a wedge retention disk of FIG. 7 in a different configuration.

Referring now to FIGS. 5 and 6, an exemplary embodiment of wedge retention device 50 is a substantially circular disk and includes an outer lip 52, first transition 54, anchor landing 56, second transition 58, wedge landing 60, and a central opening 62. Outer lip 52 may be sized and adapted to frictionally couple to tubular section 34, such as at groove 36 formed in encapsulation layer 32, or to engage a ring or other device embedded in or affixed to tubular section 34 (as shown in FIGS. 7 and 8) or a ring or groove formed in anchor body 20. First transition 54 extends between outer lip 52 and anchor landing 56 so as to define an anchor shoulder 57. Similarly, second transition 58 extends between anchor landing 56 and wedge landing 60 so as to define a wedge shoulder 59. Thus, outer lip 52, anchor landing 56, and wedge landing 60 each lie in a different plane. Central opening 62 may have a diameter greater than the diameter of strand 12 and smaller than the outside diameter of wedges 24, 26.

Figure 11:
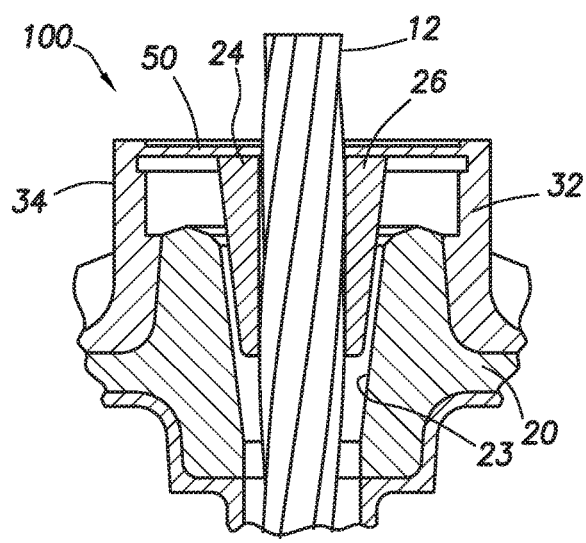
FIG. 11 is a cross-sectional view of an anchor, wedges, and a wedge retention disk in accordance with another embodiment.

Referring now to FIGS. 7 and 8, an exemplary anchor assembly 100 may include an anchor body 20 encapsulated in an encapsulation layer 32, wedges 24, 26 positioned within anchor body 20, and wedge retention disk 50 directly or indirectly coupled to anchor body 20. For example, wedge retention disk 50 may be directly mechanically coupled to anchor body 20, mechanically coupled to anchor body 20 via encapsulation layer 32 as shown in FIGS. 7 and 8, or formed integrally with encapsulation layer 32, as shown in FIG. 11.

In the embodiment of FIG. 7, wedge retention disk 50 engages a groove 36 in tubular section 34 of encapsulation layer 32 and spans the front aperture of anchor body 20 sufficiently to prevent wedges 24, 26 from passing therethrough. Wedge retention disk 50 may be positioned or configured such that anchor landing 56 is axially farther from anchor body 20 than outer lip 52 and wedge landing 60 is axially farther from anchor body 20 than anchor landing 56. Because central opening 62 of wedge retention disk 50 is smaller than the outside diameter of wedges 24, 26, wedges 24, 26 are prevented from falling out of anchor assembly 100, enabling assembly 100 to be transported and handled without loss of the wedges therefrom. This in turn means that wedge-containing assemblies can be assembled remotely from a work site, thereby avoiding the need to insert wedges into anchors at a work site. Wedge retention disk may facilitate retention of the wedges, eliminating the need to obtain and install the wedges separately. The wedge retention disk can be assembled during anchor production and inserted before leaving the manufacturing facility. If wedge retention disk 50 is formed integrally with encapsulation layer 32, encapsulation layer 32 may be added after wedges 24, 26 have been placed in wedge receiving cavity 23, or central opening 62 may be large enough to allow insertion of wedges 24, 26 after encapsulation, while still being small enough to prevent egress of wedges 24, 26, when strand 12 is inserted. By allowing the anchor assembly 100 to include the wedge set, labor and exposure to hazards are reduced. By including the wedge with the anchor, an operator does not need to load the wedge manually, so the exposure to injury during pressing/seating operations is reduced.

Still referring to FIGS. 7 and 8, in some embodiments, wedge retention disk 50 may engage tubular section 34 of encapsulation layer 32 at a point that is axially spaced from anchor body 20 by a distance 25. In such embodiments, unless a strand is present in the anchor and a tensioning force is applied to the strand, wedges 24, 26 are free to move axially with respect to the anchor body. Thus, wedges 24, 26, may, as a result of handling or the like, shift relative to anchor body 20 and move outwardly of wedge receiving cavity 23. Wedges 24, 26 can move between a seated position in which wedges 24, 26 engage the wedge receiving cavity 23 and an unseated position in which wedges 24, 26 engage the wedge retention disk. A partial shifting of wedges 24, 26 out of wedge receiving cavity 23 is illustrated in FIG. 8.

Figure 9:
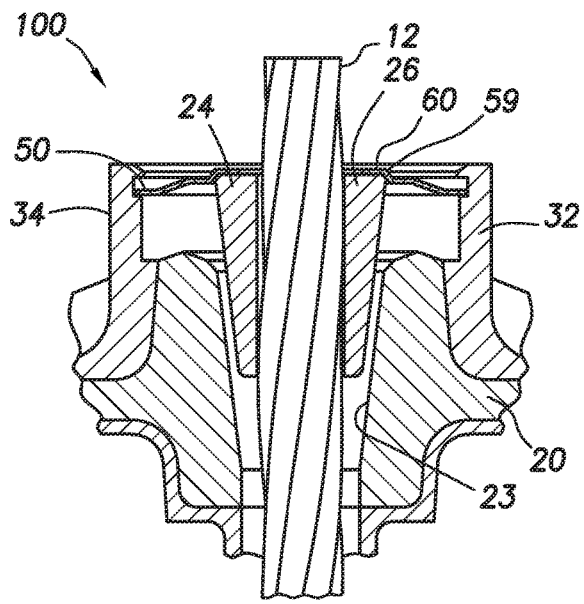
FIG. 9 is a cross-sectional view of an anchor, wedges, a wedge retention disk, and a strand.

Referring now to FIG. 9, if wedges 24, 26 shift by distance 25, wedges 24 may engage wedge shoulder 59 and wedge landing 60. Wedge shoulder 59 helps ensure that wedges 24, 26 do not shift laterally or become canted with respect to wedge receiving cavity 23, thereby ensuring that wedges 24, 26 ultimately re-seat correctly in wedge receiving cavity 23. Wedges 24, 26 may shift out of wedge receiving cavity 23 as a result of handling the anchor assembly, or as a result of insertion of a strand 12 into anchor assembly 100, as shown in FIG. 9. In some embodiments strand 12 may extend through central opening 62 of wedge retention disk 50. As strand 12 is inserted and moves through anchor assembly 100 (in an upward direction as drawn), the displacement of wedges 24, 26 in the same direction is limited by wedge retention disk 50 and wedge shoulder 59 thereof. When a seating/tensioning force or other force causes strand 12 to pull back through anchor assembly 100 (in a downward direction as drawn), engagement between strand 12 and wedges 24, 26 may cause wedges 24, 26 to re-seat in wedge receiving cavity 23.

Figure 10:
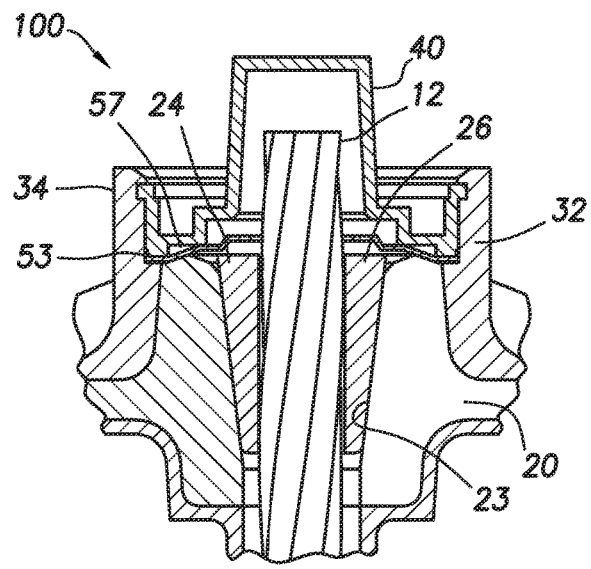
FIG. 10 is a cross-sectional view of an anchor, wedges, a wedge retention disk, a strand, and a cap.

Wedge retention disk 50 may be shifted concurrently with the backward (downward) movement of strand 12, or it may remain positioned as shown in FIG. 9 until separately dislodged. Regardless of whether wedge retention disk 50 is integrally formed as part of encapsulation layer 32 or formed separately from encapsulation layer 32 and mechanically coupled thereto, wedge retention disk 50 will tend to remain in place until a sufficient separating force is applied to separate wedge retention disk 50 from the tubular section 34. Such a separating force may be applied by a tool or other suitable means. For example, a separating force may be applied by a cap 40, such as may be used to enclose the end of strand 12, as shown in FIG. 10, by a device coupled to strand 12, or by a separate tool. When shifted, wedge retention disk 50 may move toward anchor body 20 until anchor body 20 engages anchor landing 56 and anchor shoulder 57 of wedge retention disk 50. In some embodiments, the perimeter of outer lip 52 may deform as wedge retention disk 50 moves toward anchor body 20, as shown at 53 in FIG. 10. In some embodiments, wedge retention disk 50 may be displaced by the insertion of cap 40 into tubular section 34 so that the repositioning of wedge retention disk 50 requires no additional labor steps.

In some embodiments, the wedge retention disk 50 may be sacrificial. In some embodiments, the seating of wedges 24, 26 may crush or deform disk 50, allowing the grease cap to be inserted as it is without the disk.

Figure 13:
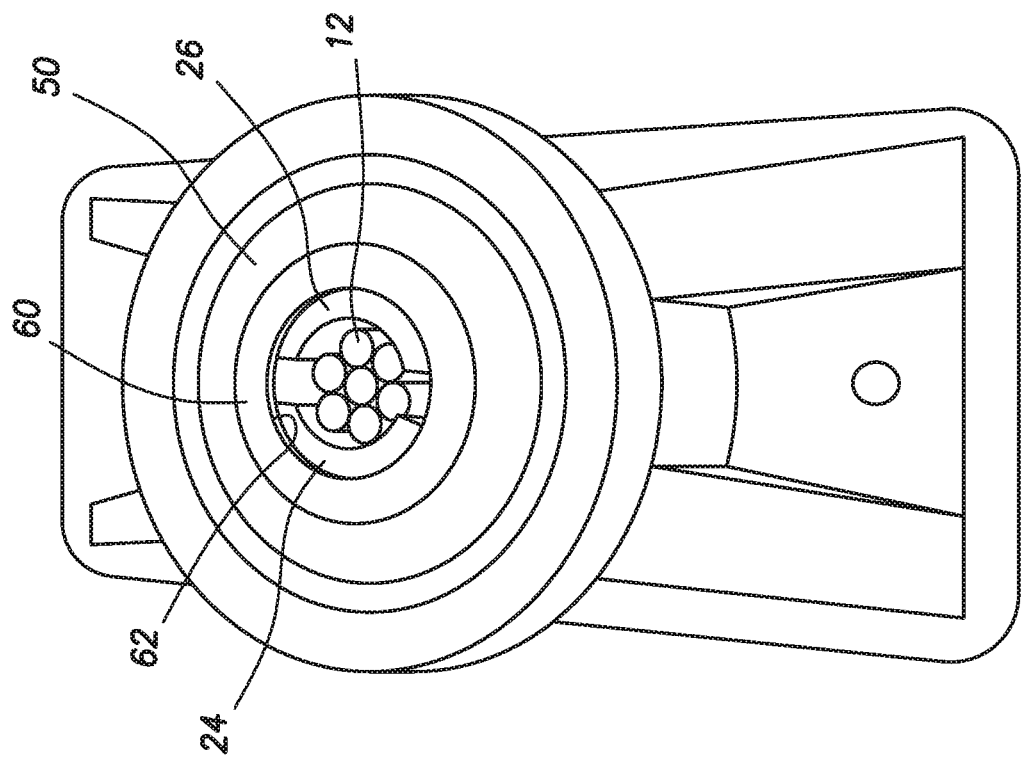
FIG. 13 is a perspective view of the anchor, wedges, and wedge retention disk of FIG. 12, with a tendon inserted between the wedges and the wedges in an unseated position.
Figure 12:
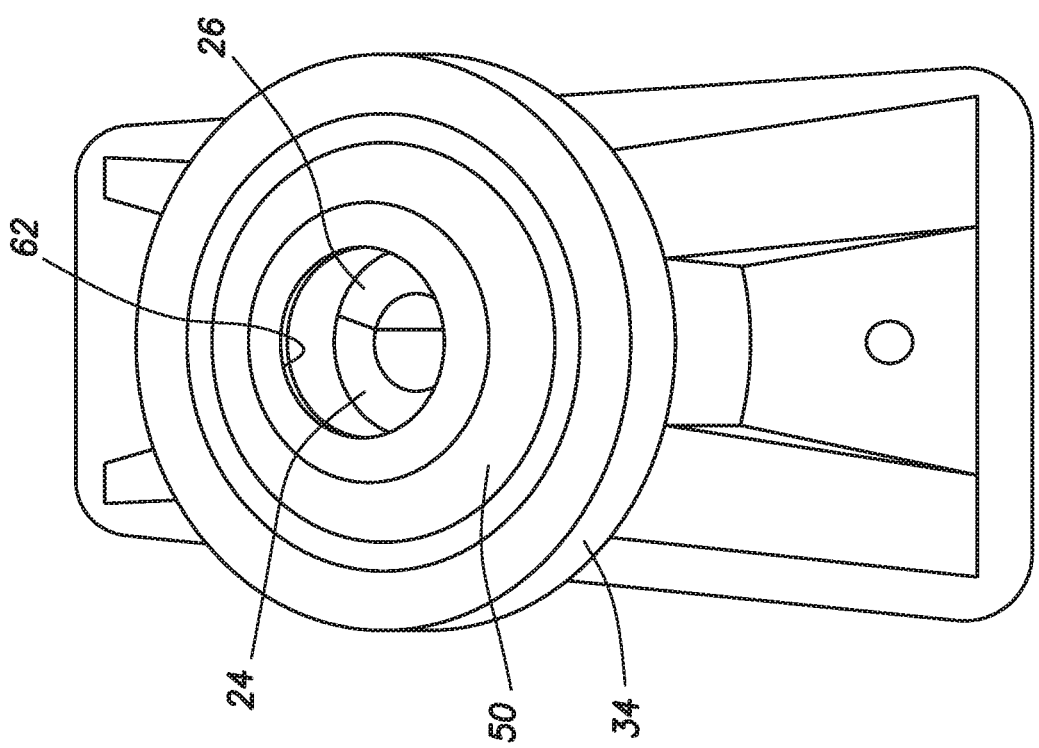
FIG. 12 is a perspective view of an anchor, wedges, and wedge retention disk, with no tendon inserted between the wedges and the wedges in a seated position.

An additional embodiment is illustrated in FIGS. 12 and 13, in which FIG. 12 shows wedges 24, 26 in a seated configuration similar to that illustrated in FIG. 7 and FIG. 13 shows wedges 24, 26 in a unseated configuration similar to that illustrated in FIG. 9. In FIG. 13, it can be seen that wedges 24, 26 have moved slightly apart to accommodate strand 12 between them. Wedges 24, 26 engage wedge landing 60 and are prevented from passing through opening 62 in wedge retention disk 50.

Anchor assembly 100 permits a reduction of inventory requirements by including the wedge components as part of the anchor. That is, separate wedge supplies may not be required on a seating bench if the fixed-end anchor assembly is supplied with wedges already installed. In addition, an anchor that includes a wedge retention disk or wedge retention disk may increase productivity and reduce risk of injury during the seating process.

It will be understood that while the present disclosure describes the use of a two-part wedge assembly, the concepts disclosed herein can be used with any suitable wedge assembly, including but not limited to single wedges and multi-part wedges. Likewise, the wedge retention disks disclosed herein may be incorporated on live-end (stressing-end) anchors as well, offering similar benefits as are realized when the disks are used with fixed-end anchors. Likewise, wedge retention disk 50 may engage encapsulation layer 32 as shown or may couple directly to anchor body 20 via a groove, teeth, or other coupling means.

The independent embodiments described above and illustrated in the figures are presented by way of example only and are not intended as a limitation upon the concepts and principles of the present disclosure. As such, it will be appreciated that various changes in the elements and their configuration and arrangement are possible without departing from the scope of the present disclosure. Likewise, unless explicitly so recited, the sequential recitation of steps does not require sequential performance of those steps.

What is claimed is:

1. An anchor assembly for use with a tensioning strand, comprising:
    an anchor body including a bore therethrough, the bore configured to receive the strand therethrough, an inner surface of the bore including a frustoconical wedge-receiving cavity;
    at least one frustoconical wedge including a strand-engaging inner surface and an anchor body engaging outer surface, the at least one wedge being at least partially received in the wedge-receiving cavity;
    an encapsulating layer at least partially surrounding the anchor body;
    a wedge retention disk integrally formed with the encapsulating layer, the wedge retention disk being configured so as to prevent the at least one wedge from fully exiting the wedge-receiving cavity, the wedge retention disk being displaceable; and wherein a perimeter of the wedge retention disk is configured to be deformed as the wedge retention disk moves toward the anchor body.

2. The anchor assembly of claim 1 wherein the wedge retention disk is axially spaced apart from the anchor body, whereby the at least one wedge can move axially with respect to the anchor body between a seated position in which the at least one wedge engages the wedge-receiving cavity and an unseated position in which the at least one wedge engages the wedge retention disk.

3. The anchor assembly of claim 2 wherein the wedge retention disk comprises an anchor landing, a wedge landing, and a central opening that is smaller than an outside diameter of the at least one wedge, and wherein the anchor landing and the wedge landing lie in different planes and define a wedge shoulder therebetween.

4. The anchor assembly of claim 1 wherein the wedge retention disk comprises an anchor landing and a wedge landing, wherein the anchor landing and the wedge landing lie in different planes and define a wedge shoulder therebetween.

5. The anchor assembly of claim 4, wherein the wedge retention disk includes a central opening that is smaller than an outside diameter of the at least one wedge.

6. The anchor assembly of claim 5, wherein the central opening is larger than an outside diameter of the tensioning strand.

7. The anchor assembly of claim 4 wherein the encapsulation layer includes a tubular section that extends outwardly from the anchor body and wherein the wedge retention disk is frictionally coupled to the tubular section.

8. A method for applying an anchor assembly to a tensioning strand, comprising the steps of:
    a) providing an anchor assembly comprising:
        an anchor body including a bore therethrough, the bore configured to receive the strand therethrough, an inner surface of the bore including a frustoconical wedge-receiving cavity;
        at least one frustoconical wedge including a strand-engaging inner surface and an anchor body engaging outer surface, the at least one wedge being at least partially received in the wedge-receiving cavity;
        an encapsulating layer at least partially surrounding the anchor body; and
        a wedge retention disk integrally formed with the encapsulating layer, the wedge retention disk being configured so as to prevent the at least one wedge from fully exiting the wedge-receiving cavity, the wedge retention disk being displaceable; and wherein a perimeter of the wedge retention disk is configured to be deformed as the wedge retention disk moves toward the anchor body;
    b) inserting a strand through the anchor body and the at least one wedge;
    c) retaining the at least one wedge at least partially within the wedge-receiving cavity with the wedge retention disk;
    d) applying a tensioning force on the strand so as to move the strand and the at least one wedge into a seated position in which the at least one wedge engages the wedge-receiving cavity and the strand.

9. The method of claim 8 wherein the wedge retention disk defines a space between the anchor body and the encapsulating layer, whereby the at least one wedge can move axially with respect to the anchor body between the seated position and an unseated position in which the at least one wedge engages the wedge retention disk.

10. The method of claim 9 wherein step b) includes inserting the strand through the wedge retention disk.

11. The method of claim 8, further including the step of:
    e) adding a cap to the anchor assembly and coupling the cap to the encapsulating layer;
    wherein step e) includes displacing the wedge retention disk.

12. The method of claim 11 wherein step e) includes separating the wedge retention disk from the encapsulating layer.

13. The method of claim 8 wherein the wedge retention disk further includes a wedge shoulder and wherein the wedge shoulder retards movement of the at least one wedge such that the at least one wedge does not shift laterally or become canted with respect to the wedge-receiving cavity.

14. A method for constructing an anchor assembly for use with a tensioning strand, comprising the steps of:
    a) providing an anchor body including a bore therethrough, the bore configured to receive the strand therethrough, an inner surface of the bore including a frustoconical wedge-receiving cavity;
    b) providing at least one frustoconical wedge including a strand-engaging inner surface and an anchor body engaging outer surface, and positioning the at least one wedge at least partially in the wedge-receiving cavity;
    c) at least partially encapsulating the anchor body in an encapsulating layer;

d) providing a wedge retention disk, wherein the wedge retention disk is integrally formed with the encapsulating layer, the wedge retention disk being configured so as to prevent the at least one wedge from fully exiting the wedge-receiving cavity, the wedge retention disk being displaceable; and wherein a perimeter of the wedge retention disk is configured to be deformed as the wedge retention disk moves toward the anchor body.

15. The method of claim 14 wherein the wedge retention disk defines a space between the anchor body and the encapsulating layer, whereby the at least one wedge can move axially with respect to the anchor body between the seated position and an unseated position in which the at least one wedge engages the wedge retention disk.

\* \* \* \* \*